Nov. 10, 1925.

C. R. SHORT

PISTON

Filed Aug. 29, 1923

1,561,030

Witnesses
Wm. P. Pasco.
Geo. C. Pasco.

Inventor
Charles R. Short
By
Francis D. Hardesty
His Attorney

Patented Nov. 10, 1925.

1,561,030

UNITED STATES PATENT OFFICE.

CHARLES R. SHORT, OF DAYTON, OHIO, ASSIGNOR TO GENERAL MOTORS RESEARCH CORPORATION, OF DAYTON, OHIO, A CORPORATION OF DELAWARE.

PISTON.

Application filed August 29, 1923. Serial No. 660,047.

*To all whom it may concern:*

Be it known that I, CHARLES R. SHORT, a subject of the King of Great Britain, residing at Dayton, county of Montgomery, and State of Ohio, have invented certain new and useful Improvements in Pistons, of which the following is a full, clear, and exact description.

This invention relates to pistons for internal combustion engines and has as one of its objects to minimize the heat transference from the piston head to the skirt whereby a more closely fitting skirt may be used.

Another object is to so attach the piston head to the skirt by means of a slip connection that the greater expansion of the head due to its greater change of temperature will not deform the skirt or force it out of round.

Further objects and advantages of the present invention will be apparent from the following description, reference being had to the accompanying drawings, wherein a preferred embodiment of the present invention is clearly shown.

In the drawings.

Similar reference characters refer to similar parts throughout the several views.

Figure 1:
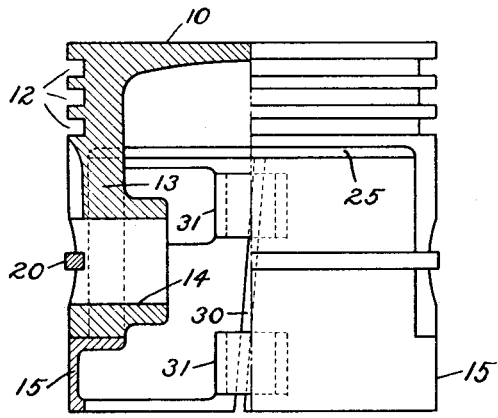
Fig. 1 is a view, partly in section, of a two piece piston constructed according to this invention.
Figure 2:
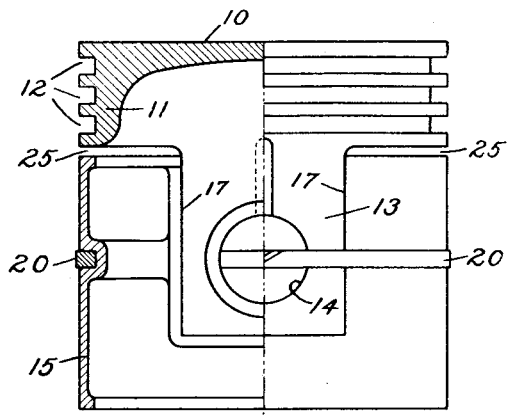
Fig. 2 is a view similar to Fig. 1 but taken at right angles thereto.
Figure 4:
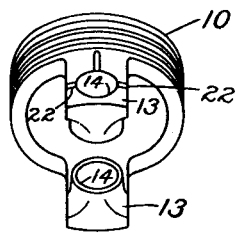
Fig. 4 is a perspective view of the piston head portion with its integral wrist pin bosses.
Figure 5:
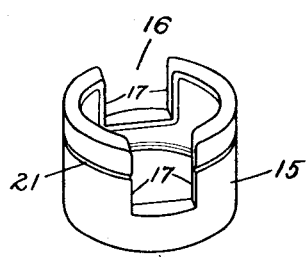
Fig. 5 is a perspective view of the skirt portion.
Figure 3:
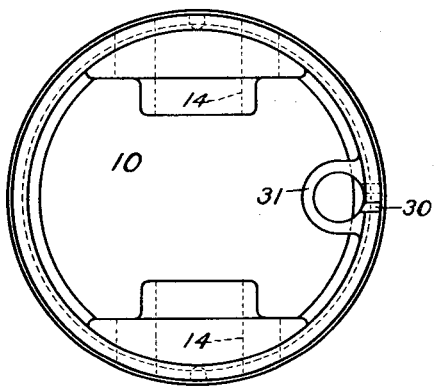
Fig. 3 is a bottom view of the assembly of Fig. 2.

In the drawings, the numeral 10 designates the piston head portion, in its entirety, which is provided with a short cylindrical portion 11 having the packing ring groove 12 therein and the depending projections 13 which serve as the wrist pin bosses. The skirt portion 15 preferably has quite thin walls in order to minimize weight and is provided with recesses 16 which fit snugly around the projections 13. The side faces 17 of the projections 13 and recesses 16 are plane surfaces and are preferably parallel to the axis of the wrist pin bearings 14. The side thrust of the piston due to the angularity of the connecting rod is transmitted across these surfaces 17 to the skirt portion which in turn bears against the cylinder walls and thus acts as a cross-head for the piston head. The piston head is of smaller diameter than the skirt and is given such clearance that at its maximum temperature it does not bear against the cylinder walls. The skirt portion 15 is held up around the projections 13 by means of a yieldable ring 20, similar to the ordinary packing rings, which fits within a groove 21 in the skirt portion and the aligned groove 22 on the projections 13. The skirt portion 15 clears the cylindrical portion 11 of the piston head by the narrow clearance space 25 which extends on both sides from one of the projections 13 to the other. It is thus provided that heat can be conducted from the head 10 to the skirt 15 only through the surfaces 17 and the bottom surfaces of the projections 13. Thus it is seen that heat transference from the head to the skirt will be minimized and hence the temperature of the skirt portion will be substantially that of the cylinder walls along which it reciprocates. This will enable the usual clearance between the skirt and cylinder walls to be greatly reduced and remain substantially constant through a wide variation of engine temperatures.

Also, since the surfaces 17 are parallel, a slip connection between the head portion 10 and skirt portion 15 is provided. The high temperature reached by the head 10 will cause it to expand a relatively large amount compared to that of the skirt portion and this slip connection will permit the relative movement necessary to accommodate the difference in expansion between the head and skirt portions without in any way distorting the shape of the skirt portion. Of course, the outer faces of the projections 13 are given sufficient clearance to avoid their bearing upon the cylinder walls at maximum temperature. As the projections 13 move apart due to the expansion of the piston head 10 the ring 20 will yield sufficiently to permit this expansion. It will be noted that the ring 20 extends around the outside of the wrist pin bearings 14 and hence will prevent the wrist pin from scoring the cylinder walls.

The skirt 15 may be provided with a split 30, as clearly shown in Fig. 1 to provide for abnormal expansion of the skirt portion. Preferably the edges of the walls at the split 30 are backed up by the loops 31 which are cast integral with the skirt. These loops 31 hold the edges of the skirt walls more or less yieldably in place. If the skirt expands enough to cause binding upon the cylinder walls the loops 31 will yield sufficiently to permit the edges of the walls to come closer together and thus slightly decrease the diameter of the skirt.

Preferably both the head portion 10 and skirt portion 15 are of cast aluminum but of course they could be of cast iron or other metal if desired.

While the form of embodiment of the present invention as herein disclosed constitutes a preferred form, it is to be understood that other forms might be adopted, all coming within the scope of the claims which follow.

What I claim is as follows:

1. A piston for an internal combustion engine comprising, a head portion having a packing ring groove therein and two diametrically opposed projections integral therewith serving as wrist pin bosses, and a skirt portion having recesses therein within which said projections lie, and a ring encircling the skirt portion and embedded in grooves in said skirt and said projections whereby said skirt and head portions are secured together.

2. A piston for an internal combustion engine comprising, a head portion having a packing ring groove therein and two diametrically opposed projections integral therewith serving as wrist pin bosses, and a skirt portion secured to said head portion by having recesses therein snugly fitting said projections but permitting relative motion between said skirt and head in the direction of the wrist pin axis.

3. A piston for an internal combustion engine comprising, a head portion having a packing ring groove therein and two diametrically opposed projections integral therewith serving as wrist pin bosses, and a skirt portion having recesses therein in which said projections have a sliding fit.

4. A piston for an internal combustion engine comprising, a head portion having a packing ring groove therein and two diametrically opposed projections integral therewith serving as wrist pin bosses, and a skirt portion having recesses therein in which said ring projections have a sliding fit, and a ring encircling the skirt portion and embedded in grooves in said skirt and said projections whereby said skirt and head portions are secured together.

5. A piston having a cast aluminum head with a packing ring groove therein and integral wrist pin bosses, and a separate aluminum skirt slidably secured to said head adjacent said bosses whereby unequal expansion of the head and skirt does not distort said skirt.

In testimony whereof I hereto affix my signature.

CHARLES R. SHORT.